(No Model.)
A. N. CHALMERS & J. R. WALLACE.
CLAMP FOR PLANERS OR OTHER MACHINES.
No. 459,530. Patented Sept. 15, 1891.
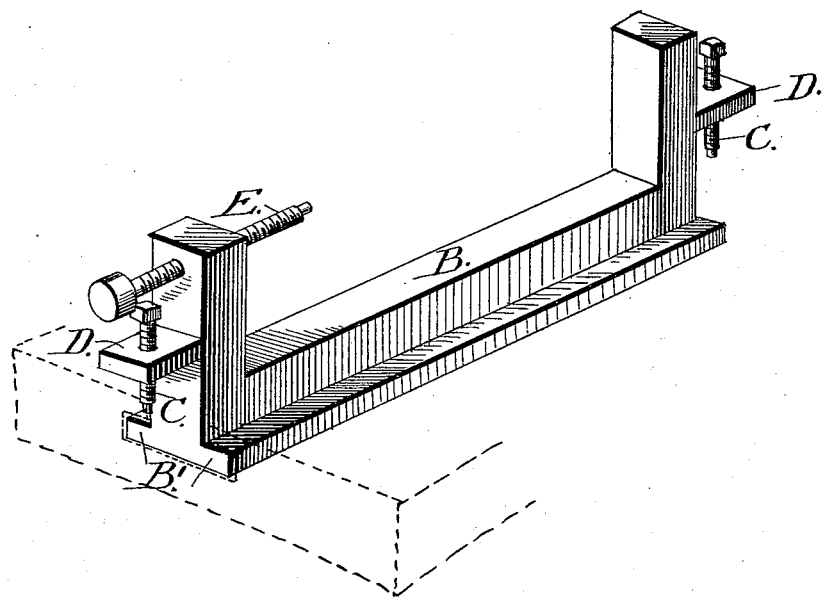
WITNESSES
J. Edw. Fowler
Chapman Fowler
INVENTORS
John R. Wallace
Alexander N. Chalmers
by Dewey & Co
Attorneys

UNITED STATES PATENT OFFICE.

ALEXANDER N. CHALMERS AND JOHN R. WALLACE, OF SAN FRANCISCO, CALIFORNIA.

CLAMP FOR PLANERS OR OTHER MACHINES.

SPECIFICATION forming part of Letters Patent No. 459,530, dated September 15, 1891.

Application filed February 3, 1891. Serial No. 380,074. (No model.)

*To all whom it may concern:*

Be it known that we, ALEXANDER N. CHALMERS and JOHN R. WALLACE, citizens of Scotland, residing in the city and county of San Francisco, State of California, have invented an Improvement in Clamps for Planers and other Machines; and we hereby declare the following to be a full, clear, and exact description of the same.

Our invention relates to an improved adjustable clamp for use upon planers, drilling, shaping, and other machines.

It consists in certain details of construction, which will be more fully explained by reference to the accompanying drawing, in which the figure illustrates a clamp having extended base, vertical ends, and a means for locking it upon the table.

B is the base or shank of the clamp, having the flanges B' extending horizontally upon either side, these flanges being of sufficient thickness to enter the grooves or slots in the bed-plate, while the body or shank extends up through the narrower portion of the slot to the face of the table and to the bottom of the clamp, of which it forms an extension.

C C are set-screws passing through outwardly-extending horizontal lugs D, as shown, and these screws may be turned so as to press upon the table or bed-plate after the foot of the clamp has been inserted in its channel and moved to the desired point. These set-screws serve to hold the clamp firmly in place, and any article which is to be secured to the table to be planed, drilled, or have other work done to it is held in place by means of the screws E, which pass through one of the vertical ends of the yoke or clamp, so that when turned down they will press upon the article and hold it in place. It will be readily seen that any number of these clamps may be inserted into the various slots in the table, so as to be applied to different parts of large pieces, which are thus easily and firmly secured in place to be acted upon by the proper tools connected with the table upon which the work is fixed.

Having thus described our invention, what we claim as new, and desire to secure by Letters Patent, is—

An improved clamp for planers and analogous machines, consisting of a base having flanges or ribs extending upon either side thereof, said base having vertical ends, horizontal lugs projecting outwardly from said vertical ends, screws passing vertically through said lugs and to bear upon the table or bed-plate, and a second screw passing horizontally through one of the vertical ends of the base to clamp upon the article, substantially as herein described.

In witness whereof we have hereunto set our hands.

ALEXANDER N. CHALMERS.
JOHN R. WALLACE.

Witnesses:
LINCOLN SONNTAG,
S. H. NOURSE.